UNITED STATES PATENT OFFICE.

EBENEZER KENNARD MITTING, OF CHICAGO, ILLINOIS, ASSIGNOR, BY MESNE ASSIGNMENTS, TO ALBERT DOMEIER, OF LONDON, ENGLAND.

PROCESS OF RECOVERING GLYCERIN AND SALT FROM SPENT SOAP-LYE.

SPECIFICATION forming part of Letters Patent No. 522,023, dated June 26, 1894.

Application filed August 3, 1891. Serial No. 401,490. (No specimens.)

*To all whom it may concern:*

Be it known that I, EBENEZER KENNARD MITTING, a subject of the Queen of Great Britain and Ireland, residing at Chicago, in the county of Cook and State of Illinois, have invented certain new and useful Improvements in Processes of Recovering Glycerin and Salt from Spent Soap-Lye, of which the following is a specification.

The object of this invention is to provide an improved process for recovering glycerine and salt from spent soap lye.

I take the spent soap lye into a suitable tank and there add to and intimately mix with it a small proportion of lime—preferably in the form of "milk of lime." The quantity of the lime required varies with the quality of the lye under treatment, but usually from one fifth to one third of one per cent. by weight of the lye is sufficient. Enough should be employed to produce a well defined precipitate, leaving the lye clear and bright and without soapy foam. I allow the mixture to settle and remove the clear liquor from the precipitate by decantation or filtration and concentrate it by boiling until it is nearly saturated with salt. This usually occurs when from two to two and one-half volumes have been reduced to one volume. I now again treat the lye with lime as before. The quantity of lime required in this operation is usually from one quarter to one half of one per cent. by weight on the lye. Enough should be used to decolorize the lye as much as possible. I allow the mixture to settle, decant or filter it from the precipitate and convey it to a suitable vessel and boil it with an excess of fat, fatty acid or rosin, or a mixture of these. By an excess I mean sufficient or more than sufficient to combine with and remove all the free alkali present in the lye, which will now have a neutral or very nearly neutral reaction. I next draw off the lye from the soap thus formed, and again treat it with lime. The quantity of lime required for this operation is usually from one tenth to one fifth of one per cent. by weight of the lye and this treatment has for its object the complete removal of any fatty and resinous matters which have gone into solution or suspension during the previous operation of saponification. I filter or decant the clear lye from the precipitate, and if the operations have been properly conducted the lye should be perfectly bright and clear, of a very light color and only feebly alkaline. I now concentrate this purified lye by evaporation until it boils at about 300° Fahrenheit, and thus produce crude glycerine containing a comparatively small amount of organic matter, and only a fraction of one per cent. of free alkali, and of a quality which can be distilled without further treatment. During the concentration salt is deposited. This I remove and wash free from adhering glycerine liquor and render fit for use again in the manufacture of soap.

With some qualities of spent soap lye the second treatment with lime above described may be dispensed with and the concentration to nearly salting point, and the boiling with fat, fatty acid or rosin may be effected simultaneously, but it is usually necessary and advisable to give the full treatment described.

This process is advantageous for use in soap factories situated away from centers of production of acids or chemicals usually employed in the art, while the active ingredients employed are found in every soap factory.

I claim—

1. In the art of recovering glycerine and salt from spent soap lye the improvement which consists in adding lime to the lye and removing the precipitate, boiling the lye with fat, fatty acid or rosin and separating it from the soap thus formed, then adding lime to the lye and removing the precipitate and concentrating the clear liquor, substantially as specified.

2. In the art of recovering glycerine and salt from spent soap lye the improvement which consists in adding lime to the lye and removing the precipitate, concentrating the clear liquor and boiling it with fat, fatty acid or rosin and separating it from the soap thus formed then adding lime and next removing the precipitate and concentrating the clear liquor, substantially as specified.

3. In the art of recovering glycerine and salt from spent soap lye the improvement which consists in adding lime to the lye and removing the precipitate, concentrating the clear lye and again adding lime and removing the precipitate, then boiling the lye with fat, fatty acid or rosin, removing it from the soap thus formed, again adding lime and removing the precipitate and finally concentrating the clear liquor, substantially as specified.

EBENEZER KENNARD MITTING.

Witnesses:
FREDERICK C. GOODWIN,
N. M. BOND.